United States Patent

[11] 3,634,626

[72] Inventor James Gordon Staley
Batavia, N.Y.

[21] Appl. No. 25,903
[22] Filed Apr. 6, 1970
[45] Patented Jan. 11, 1972
[73] Assignee Sylvania Electric Products Inc.

[54] NOISE-OPERATED AUTOMATIC STEREO TO MONAURAL SWITCH FOR FM RECEIVERS
12 Claims, 2 Drawing Figs.

[52] U.S. Cl. ........ 179/15 BT
[51] Int. Cl. ........ H04h 5/00
[50] Field of Search ........ 179/15 BT; 325/348, 402, 456, 478, 473

[56] References Cited

UNITED STATES PATENTS

| | | | |
|---|---|---|---|
| 3,569,633 | 3/1971 | Brahman | 179/15 BT |
| 3,296,379 | 1/1967 | Recklinghausen | 179/15 BT |
| 3,296,378 | 1/1967 | Fish | 179/15 BT |
| 3,290,443 | 12/1966 | Mergner | 179/15 BT |

FOREIGN PATENTS

| | | | |
|---|---|---|---|
| 1,280,328 | 2/1966 | Germany | 179/15 BT |

*Primary Examiner*—Kathleen H. Claffy
*Assistant Examiner*—Thomas D'Amico
*Attorneys*—Norman J. O'Malley, Robert E. Walrath, Edward J. Coleman and Thomas H. Buffton

ABSTRACT: In an FM stereo receiver including an FM signal detector, a multiplex demodulating synchronous detector, and a circuit for coupling the output signal of the FM detector to one input of the synchronous detector and for separating a pilot signal from the FM detector output signal for application through a full-wave rectifier and transistor amplifier to provide a demodulating signal to a second input of the synchronous detector, a circuit for automatically switching from stereophonic to monaural operation in response to a predetermined noise level at the output of the FM signal detector. The switching circuit comprises a high-pass filter connected at the output of the FM signal detector, a transistor amplifier for processing the noise passed by the filter, a noise rectifier, and a voltage divider for applying the rectified noise signal as a base bias control voltage for the demodulating signal amplifier. The resistors comprising the voltage divider are selected to determine a noise level above which the demodulating signal amplifier is rendered nonconducting and below which that amplifier is biased to conduction. A manually operated switch in the base bias circuit of the noise amplifier provides means for inactivating the automatic switching circuit.

INVENTOR.
JAMES G. STALEY
BY
Robert E. Walrath
ATTORNEY

NOISE-OPERATED AUTOMATIC STEREO TO MONAURAL SWITCH FOR FM RECEIVERS

BACKGROUND OF THE INVENTION

This invention relates generally to FM stereophonic radio receivers and, more particularly, to improved means in such receivers for automatically switching from stereophonic to monaural operation in response to predetermined characteristics of the received signal in order to enhance the signal-to-noise ratio.

Stereophonic FM radio receivers of the type under discussion are adapted for the reception of a broadcast signal which is a composite of three components, namely, frequency modulation signal components extending from 30 Hz. to 15 kHz. and representing the sum of the left and right stereophonic signals, a double sideband, suppressed subcarrier amplitude modulated signal which is the difference of the left and right information in a band extending from 23 to 53 kHz. and a low-amplitude 19 kHz. pilot carrier as a reference for producing a demodulating wave at 38 kHz. for the suppressed subcarrier sideband information. The sum of the right and left audiofrequency signals represents monaural information and is frequency modulated on the main carrier so that the composite signal is compatible for reception by radio receivers which do not have the necessary circuitry to produce stereophonic information in response to the pilot carrier and the suppressed subcarrier modulation information.

In the FM stereo receiver, this incoming composite signal is processed through to a standard FM detector after which the 19 kHz. pilot carrier is separated from the detected signal for controlling a circuit to locally produce the synchronized 38 kHz. demodulating signal. The detected signal and demodulating wave are then processed in a multiplex demodulator to recover the original stereophonic right and left audiofrequency signals. One of two major types of multiplex demodulators are generally employed. In one type of system, the subcarrier sidebands and the demodulating wave derived from the 19 kHz. pilot signal are fed to a synchronous detector to demodulate the sidebands and obtain the audiofrequency frequency difference signal. This difference signal is then combined with the sum signal in suitable matrix circuitry to derive the original left and right signals. The other major type of system is referred to as the time division multiplex or switching system wherein the composite stereophonic signal is fed to a synchronous detector circuit together with the demodulating wave derived from the pilot signal. In this type of system the composite wave is synchronously sampled to directly provide the left and right output signals.

To avoid the reproduction of objectionable noise in the receiver, it is desirable to cut off the 38 kHz. demodulating wave, and thereby disable the multiplex demodulator, when a frequency modulation station broadcasts monaural program material and therefore does not transmit a 19 kHz. pilot signal, or when a relatively weak stereophonic signal is received, or when the receiver is being tuned from one station to another. This changeover from stereophonic to monaural operation has commonly been provided by a manual switching arrangement. As manual switching is inconvenient, however, deluxe FM stereo receivers are generally provided with a relatively expensive automatic stereo to mono switch activated upon reception of a pilot signal which exceeds a predetermined threshold level. A stereo to mono changeover function based on the presence of a pilot signal or a given pilot signal amplitude, however, in addition to the disadvantage of cost, does not provide optimum noise avoidance and operates with a relatively unnatural response with respect to the listener.

SUMMARY OF THE INVENTION

Accordingly, it is an object of the present invention to provide an improved automatic stereo to monaural switch for FM receivers.

It is another object of the invention to provide improved means in an FM stereophonic radio receiver for automatically switching from stereophonic to monaural operation in response to a predetermined received noise level.

Briefly, these objects are attained in an FM stereo receiver including an FM signal detector, a multiplex demodulator, means for processing an output signal from the signal detector to a first input of the multiplexed demodulator, and means for deriving from the signal detector output a demodulating signal for application to the second input of the multiplexed demodulator, the demodulator being responsive to these input signals to produce the desired left and right audiofrequency signals. According to one aspect of the invention, the FM stereo receiver includes means for automatically switching the receiver from stereophonic to monaural operation in response to a predetermined noise level at the output of the signal detector. This noise-operated switching means comprises means for detecting the presence of noise at the output of the FM signal detector, means for converting the detected noise to a direct current signal of representative magnitude, and means for applying the direct current noise signal as a control voltage for the demodulating signal deriving means, whereby the deriving means is enabled to provide a demodulating signal in response to a control voltage representative of a detected noise below a predetermined level and the deriving means is disabled to cut off the demodulating signal in response to a control voltage representative of a detected noise above the predetermined level.

In one particular aspect of the invention, the means for deriving a demodulating signal includes an amplifier for coupling the derived demodulating signal to the second input of the multiplex demodulator, and the direct current noise signal is supplied by means of a voltage divider as a bias control voltage for the amplifier, whereby the amplifier is biased to the conducting state in response to a bias voltage representative of detected noise below a predetermined level and the amplifier is rendered nonconducting in response to a bias voltage representative of detected noise above the predetermined level. The predetermined noise level above which the amplifier is rendered nonconducting and below which the amplifier is biased to conduction is substantially determined by the selected values of the elements comprising the voltage divider.

BRIEF DESCRIPTION OF THE DRAWINGS

This invention will be more fully described hereinafter in conjunction with the accompany drawings, in which.

DESCRIPTION OF PREFERRED EMBODIMENT

For a better understanding of the present invention together with other and further objects, advantages and capabilities thereof, reference is made to the following disclosure and appended claims in connection with the above-described drawings.

Figure 1:
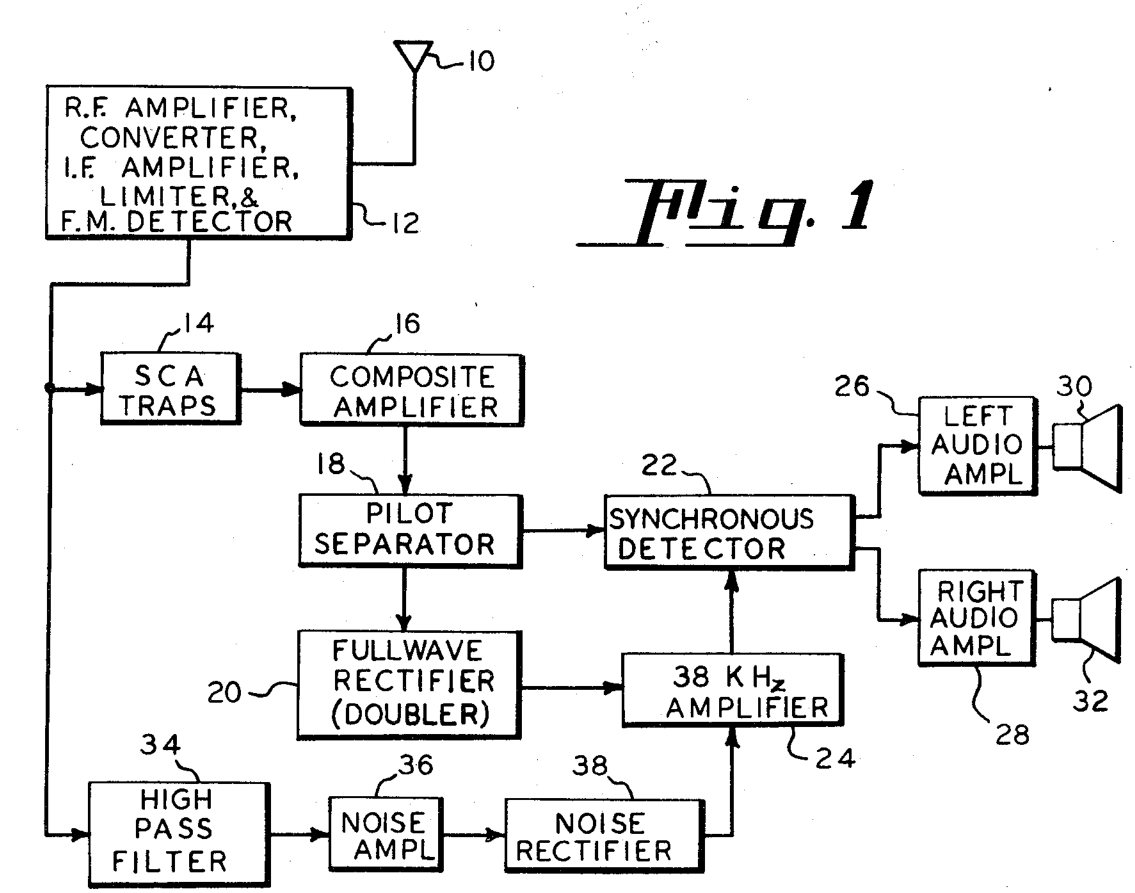
FIG. 1 is a block diagram of an FM stereo receiver including noise operated automatic stereo to monaural switching means in accordance with the invention.

In the receiver of FIG. 1, the frequency modulated carrier wave containing the sum signal of the right and left audio signals, the difference of the right and left audio signal amplitude modulated on a suppressed subcarrier wave, and a pilot signal having a frequency one-half that of the suppressed subcarrier frequency is received by the antenna 10 and applied to the circuit 12. Circuit 12 represents the usual RF amplifier, converter, IF amplifier, limiter, and frequency modulation signal detector which may be of known design, such as a ratio detector. Accordingly, the output of the FM signal detector of circuit 12 would consist of an audiofrequency signal representing the sum of the right and left signals, which is the monaural signal information. This output would also include the 19 kHz. pilot carrier and the suppressed subcarrier difference signal components. This FM detector output signal is then processed through a set of traps, indicated by circuit block 14, which are tuned to 67 kHz. and 72 kHz. in order to suppress the so-called "subsidiary communications authorization" signal, also known as SCA or storecast signals which some stations may transmit. The signal is then processed through a composite amplifier 16 to a circuit 18, such as a tuned output transformer, which separates the 19 kHz. pilot signal for application to a full-wave rectifier 20 and couples the processed detector outputs signal, with the 19 kHz. pilot frequency suppressed, to one input of a synchronous detector 22. Full wave rectifier 20 functions to double the pilot signal frequency and thus derive the desired 38 kHz. demodulating signal, which is thereupon coupled through an amplifier 24 to a second input of synchronous detector 22.

Synchronous detector 22 may be of a conventional type employing a transformer input coupling in combination with a diode bridge configuration and appropriate output signal mixing circuitry. The 38 kHz. demodulating signal present at the output of amplifier 24 upon reception of stereo program material would be applied to the synchronous detector via its input coupling transformer, with the composite detected signal comprising the sum signal and the sidebands of the suppressed 38 kHz. subcarrier being applied through a center tap of the secondary winding of that input transformer. Upon application of these two input signals, synchronous detector 22 functions as a multiplex demodulator to produce the stereophonic left and right audio signals. Left and right audio amplifiers 26 and 28 and left and right speakers 30 and 32 are coupled to the outputs of the synchronous detector 22 to reproduce the separate left and right stereophonically related audio signals.

In accordance with the present invention, the receiver of FIG. 1 further includes circuit means for automatically switching the receiver from stereophonic to monaural operation in response to a predetermined noise level at the output of the FM signal detector in circuit 12. In particular, means is provided for detecting the presence of noise at the output of the signal detector, for converting the detected noise to a direct current signal of representative magnitude and for applying the direct current noise signal as a control voltage for the demodulating signal deriving circuitry. The noise presence detection function is provided by a high-pass filter 34 connected to the output of the FM signal detector in circuit 12, and a noise amplifier 36 connected to the output of high-pass filter 34. The amplified noise is then converted to a direct current bias control voltage for the demodulating signal amplifier 24 by means of a rectifier 38.

During the reception of a strong stereophonic signal including the 19 kHz. pilot signal, the output of the FM detector of circuit 12 will be processed to one input of synchronous detector 22, and the 38 kHz. demodulating signal will be derived from the processed detector output signal by the circuit including pilot separator 18, full-wave rectifier 20 and amplifier 24. Further, as a strong stereophonic input signal is being received, it will be assumed that the noise level of the output of the FM signal detector is below a predetermined level whereby the bias control voltage provided to amplifier 24 from noise rectifier 38 is operative to bias amplifier 24 to conduction and thus enable the derived demodulating signal to be applied to the second input of synchronous detector 22. As a result, the left and right stereophonically related audio signals will be produced via amplifiers 26 and 28 and speakers 30 and 32.

During the reception of a monaural signal having no pilot carrier, there will be no 19 kHz. frequency to separate from the detected signal for deriving the 38 kHz. demodulating signal. In the absence of this demodulating signal input, synchronous detector 22 is inactive with respect to the stereo multiplex demodulating function and merely couples the detected FM monaural signal through to the speakers. It is well known in the art that this removal of the multiplex demodulating function whereby the receiver is switched from stereophonic to monaural operation enhances the signal-to-noise ratio to avoid the reproduction of objectionable noise at the speaker outputs. This automatic stereo to monaural switching process in response to the absence of a pilot signal is a conventional technique.

The noise-operated switching circuit of the present invention comes into play to disable the demodulating signal deriving circuitry and thus the stereo multiplex demodulating function when the noise at the output of the FM detector exceeds a predetermined level, which is generally the case upon reception of a weak stereophonic FM signal, or when changing stations, or when some other source of interference is present. For this purpose, the high-pass noise filter 34 is selected to pass frequencies above the audio range, say above 20 kHz. The noise is amplified by circuit 36 and converted to a direct current control voltage by rectifier 38. The output of rectifier 38 has a magnitude representative of the detected noise level at the output of the FM detector in circuit 12. Accordingly, detected noise above the predetermined level provides a bias control voltage of sufficient magnitude to render amplifier 24 nonconducting, thereby cutting off the demodulating signal from being applied to synchronous detector 22. In this manner, the stereo multiplex demodulating function is removed to enhance the signal-to-noise ratio in response to noise, rather than a predetermined pilot signal amplitude, thereby more nearly simulating the normal response of a listener having a manually operated stereo to monaural switch.

Figure 2:
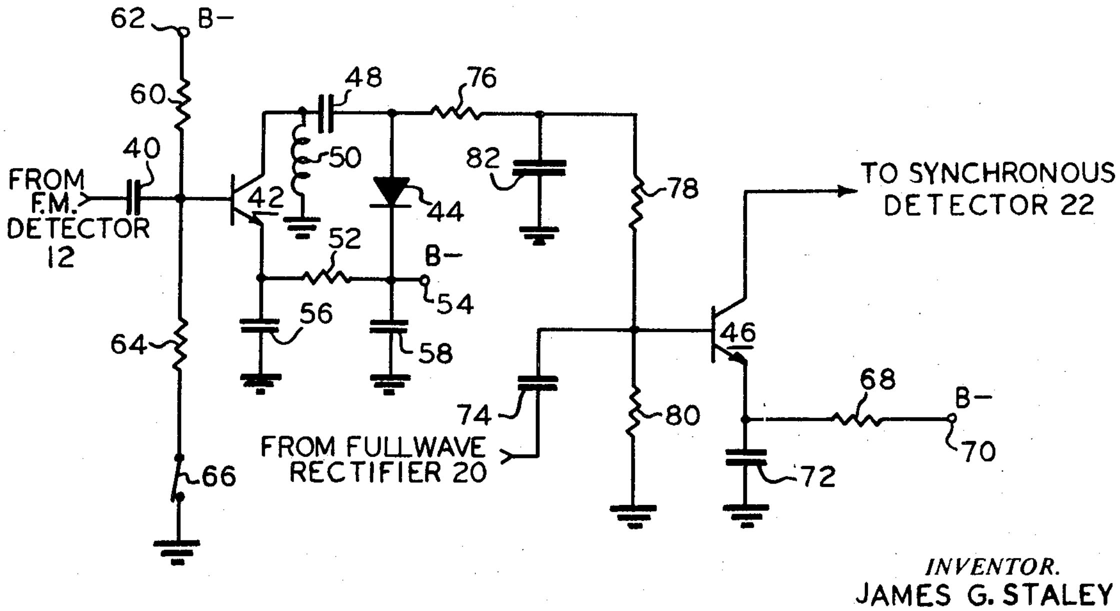
FIG. 2 is a schematic diagram of a preferred embodiment of the noise operated automatic switching means included in the receiver of FIG. 1.

A preferred embodiment of the noise-actuated switching scheme of FIG. 1 is illustrated schematically in FIG. 2. In general, high-pass filter 34 comprises the series capacitor 40; noise amplifier 36 is represented by transistor 42; noise rectifier 38 is a half-wave rectifier consisting of diode 44; and the 38 kHz. demodulating signal amplifier is represented by transistor 46. Capacitor 40 is serially connected between the output of the FM detector in circuit 12 and the base of transistor 42 and is selected to pass all detector output frequencies in the noise range, typically above 20 kHz. The collector of transistor 42 is coupled by means of a capacitor 48 to the anode terminal of the rectifier diode 44, and the collector load across which the detected noise develops is provided by a broadband choke coil 50 connected between the collector of transistor 42 and a source of reference potential represented by ground. The emitter of transistor 42 is connected through a resistor 52 to a source of negative (B−) supply potential represented by terminal 54. The cathode electrode of diode 44 is also connected to the B− terminal 54. One AC bypass capacitor 56 is connected between the emitter of transistor 42 and ground, and a second AC bypass capacitor 58 is connected between the cathode of diode 44 and ground.

The base bias for noise amplifier 42 is provided by a voltage divider comprising: a resistor 60 connected between the B− source of supply potential represented by terminal 62 and the base of transistor 42, and a resistor 64 and manually operated switch 66 serially connected in that order between the base of transistor 42 and ground. With switch 66 closed, the bias network comprising resistors 60 and 64 in cooperation with emitter resistor 52 and choke 50 tend to maintain the base emitter junction of transistor 42 forward biased so that the noise amplifier is in the active conducting state for amplifying any noise input from the FM signal detector. If switch 66 is opened, the voltage at the base of transistor 42 will become more negative thereby reverse biasing the noise amplifier. With the noise amplifier cutoff, there is no noise presence detection function so that the noise actuated switching circuitry becomes inoperative. The full effects and purpose of switch 66 will be discussed in more detail further on.

Referring now to the 38 kHz. demodulating signal amplifier transistor 46, its emitter electrode is connected through a resistor 68 to the source of B− supply potential represented by terminal 70, while its collector electrode is connected to the demodulating signal input of synchronous detector 22. An AC bypass capacitor 72 is connected between the emitter of transistor 46 and ground. A derived demodulating signal at the output of full wave rectifier 20 is coupled through capacitor 74 to the base electrode of transistor 46. The direct current noise signal provided by rectifier 44 is applied to control the base bias of transistor 46 by means of a voltage divider circuit comprising resistors 76, 78 and 80. Resistors 76 and 78 are connected between the input of the voltage divider, represented by the anode terminal of diode 44, and the base of transistor 46, with an AC bypass capacitor 82 being connected between the junction of these two resistors and ground. Resistor 80 is connected between the base of transistor 46 and ground, the junction of resistors 78 and 80 representing the output of the voltage divider.

In the presence of a relatively low noise level at the output of the FM detector, the noise "signal" passed by capacitor 40 and amplified by transistor 42 will cause a noise voltage to develop across choke 50 which is relatively small in magnitude. As a consequence, the rectified noise signal appearing at the anode of diode 44 is a relatively low magnitude negative potential whereby, upon application via resistors 76 and 78, transistor 46 will be biased to conduct and thus actively amplify and 38 kHz. modulating signal derived from the full-wave rectifier for application to the synchronous detector. As a result, the FM stereo receiver is in the state of stereophonic operation, whereby detector 22 will function as a multiplex demodulator to produce the stereophonically related left and right audiofrequency signals.

On the other hand, if the noise "signal" passed by filter capacitor 40 is above a predetermined level, the level of noise amplified by transistor 42 and developed across choke 50 will result in the buildup of a relatively large magnitude negative potential at the anode of diode 44. Upon application as a bias control signal via resistors 76 and 78, this more negative direct current noise signal at the base of transistor 46 causes this demodulating signal amplifier to become reverse biased and thus nonconducting. As a result, the demodulating signal produced at the output of full-wave rectifier 20 is cut off from application to the synchronous detector, thereby rendering inactive the multiplex demodulating function of detector 22. In this state, the receiver is providing monaural operation as detector 22 merely functions to couple the signal detected by circuit 12 to the audio amplifiers and speakers. Accordingly, the circuit of FIG. 2 provides a means for automatically switching the receiver from stereophonic to monaural operation in response to a predetermined noise level at the output of the signal detector in circuit 12.

The predetermined noise level above which transistor 46 is rendered nonconducting and below which that transistor is biased to conduction is substantially determined by the selected values of the elements of the voltage divider bias network connected to the base of transistor 46, namely, resistors 76, 78 and 80. Thus, by appropriate selection of divider resistors 76, 78 and 80, the threshold bias voltage at the base of transistor 46, which will render that transistor conducting, can be established for a given negative potential level at the anode of rectifier diode 44 representing a detector noise level at the threshold of listener tolerability.

Where the detected noise level happens to be at about the threshold level of the noise circuitry just discussed, capacitor 82 supplies "inertia" to the switching circuit to substantially eliminate oscillation of transistor 46 between conducting and nonconducting states thereby preventing the switching of synchronous detector in and out of its multiplex demodulating mode of operation. A delay in switching time due to the RC time constant of resistor 76 and capacitor 82 also eliminates false cycling of the circuit which otherwise might occur due to short term fluctuations of signal caused, for example, by fast airplane flutter.

Switch 66 can be opened to thereby reverse bias transistor 42 and inactivate the noise presence detection circuitry. AS a result, no noise signal will be coupled through capacitor 48 and the potential at the anode of diode 44 will become less negative to thereby cause transistor 46 to remain in the conducting state. In this manner, switch 66 enables the listener to listen to stereophonic operation, even though the noise may be high, if he so desires.

In summary, the present invention provides means for automatically switching from stereophonic to monaural operation to optimize the signal-to-noise ratio of an FM stereo receiver in a natural manner by means of relatively inexpensive noise responsive control circuitry. The invention may be employed in combination with multiplex demodulating schemes other than the type shown, and it is to be understood that implementation is not restricted to the arrangement shown in FIG. 2, e.g., a positive supply potential may be employed if the transistor connections are reversed. Hence, although the invention has been described with respect to certain embodiments, it will be appreciated that modifications and changes may be made by those skilled in the art without departing from the true spirit and scope of the invention.

I claim:

1. In an FM Stereo receiver including an FM signal detector for detecting a signal including a first component at audiofrequencies and a second component amplitude modulated on a suppressed subcarrier wave, multiplex demodulating means having first and second inputs, means for processing an output signal from said detector and for coupling the processed output signal to the first input of said multiplex demodulating means, means for deriving a demodulating signal from said detector output signal and applying said demodulating signal to the second input of said multiplex demodulating means, said demodulating means being operative in response to signals applied to its first and second inputs to produce left and right audiofrequency signals, means for automatically switching said receiver from stereophonic to monaural operation in response to a predetermined noise level at the output of said signal detector comprising in combination: means for detecting the presence of noise at the output of said signal detector including a high-pass filter having a low-frequency cutoff between the first and second components of the signal detected by said signal detector, means for converting the detected noise to a direct current signal representative of the magnitude of said noise, and means for applying said direct current signal as a control voltage for said means for deriving a demodulating signal, whereby said means for deriving a demodulating signal is enabled to provide said demodulating signal in response to a control voltage representative of noise below a predetermined level and is disabled to cut off the demodulating signal in response to a control voltage representative of noise above said predetermined level.

2. The combination of claim 1 wherein said high-pass filter is connected to the output of said signal detector and said low-frequency cutoff is approximately 20 kHz.

3. The combination of claim 1 wherein said means for detecting the presence of noise further includes a first amplifier having an input terminal connected to the output of said high-pass filter, and an output terminal connected to a load across which the detected noise develops for subsequent conversion to a direct current signal.

4. The combination of claim 3 wherein said means for converting the detected noise to a direct current signal comprises a rectifier coupled to the output of said first amplifier.

5. The combination of claim 4 further including means for biasing said first amplifier including a switch for enabling selective reverse biasing of said first amplifier to thereby inactivate said means for automatically switching said receiver from stereophonic to monaural operation.

6. The combination of claim 5 wherein said first amplifier comprises a transistor having base, emitter and collector electrodes, said collector being connected to said load and coupled to said rectifier, said emitter being connected through first resistance means to a first source of potential, and said base being connected to the output of said high-pass filter, and wherein said means for biasing said first amplifier includes second resistance means connected between said first source of potential and said base electrode, and third resistance means and said switch serially connected between the base of said first amplifier and a second source of potential.

7. The combination of claim 4 wherein said means for deriving a demodulating signal includes a second amplifier for coupling said demodulating signal to the second input of said multiplex demodulating means, and said direct current noise signal is applied as a bias control voltage for said second amplifier, whereby said second amplifier is biased to the conducting state in response to a bias voltage representative of detected noise below a predetermined level and said second amplifier is rendered nonconducting in response to a bias voltage representative of detected noise above said predetermined level.

8. The combination of claim 7 wherein said means for applying said direct current noise signal as a bias control voltage for said second amplifier comprises a voltage divider having an input terminal connected to the output of said rectifier, a reference terminal connected to a first source of potential and an output terminal connected to the input terminal of said second amplifier, said predetermined noise level above which said second amplifier is rendered nonconducting and below which said second amplifier is biased to conduction being substantially determined by the selected values of the elements comprising said voltage divider.

9. The combination of claim 8 wherein said second amplifier comprises a transistor having base, emitter and collector electrodes, said emitter being connected through first resistance means to a second source of potential, said collector being coupled to the second input of said multiplex demodulating means, and said derived demodulating signal being coupled to the base of said second amplifier, and wherein said voltage divider comprises second resistance means connected between the output of said rectifier and the base of said second amplifier, and third resistance means connected between the base of said second amplifier and said first source of potential, the junction of said second and said first source of potential, the junction of said second and third resistance means being the output of said voltage divider and said base electrode being the input of said second amplifier.

10. The combination of claim 8 wherein said first amplifier comprises a transistor having base, emitter and collector electrodes, said collector being connected to said load and coupled to said rectifier, said emitter being connected through first resistance means to a second source of potential, and said base being connected to the output of said high-pass filter.

11. The combination of claim 4 wherein said rectifier is a half-wave rectifier comprising a diode coupled between the output terminal of said first amplifier and a source of potential.

12. The combination of claim 3 wherein said load across which the detected noise develops comprises a choke connected between the output terminal of an amplifier and said first source of potential.

* * * * *

PO-1050
(5/69)

UNITED STATES PATENT OFFICE
CERTIFICATE OF CORRECTION

Patent No. 3,634,626 Dated January 11, 1972

Inventor(s) JAMES GORDON STALEY

It is certified that error appears in the above-identified patent and that said Letters Patent are hereby corrected as shown below:

Col. 1, line 41 per specification "the sidebands" should read - - "the subcarrier sidebands" - - .

Col. 1, line 41 per specification "audiofrequency frequency" should read - - "audio frequency"- - .

Page 5, line 22 per specification "and 38 kHz" should read - - "any 38 kHz" - - .

Col. 8 Claim 9 - lines 8-9 "said first source of potential, the junction of said second and" - - should be deleted.

Signed and sealed this 15th day of August 1972.

(SEAL)
Attest:

EDWARD M.FLETCHER,JR.
Attesting Officer

ROBERT GOTTSCHALK
Commissioner of Patents